(12) United States Patent
Osakabe

(10) Patent No.: US 7,515,316 B2
(45) Date of Patent: Apr. 7, 2009

(54) IMAGE READING DEVICE

(75) Inventor: Yoshinori Osakabe, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 992 days.

(21) Appl. No.: 10/828,325

(22) Filed: Apr. 21, 2004

(65) Prior Publication Data

US 2004/0212851 A1 Oct. 28, 2004

(30) Foreign Application Priority Data

Apr. 22, 2003 (JP) .............................. 2003-117042

(51) Int. Cl.
*H04N 1/04* (2006.01)
(52) U.S. Cl. .................... 358/474; 358/497; 358/486; 358/1.9; 382/120; 382/274
(58) Field of Classification Search .............. 358/1.9, 358/474, 1.2, 1.5, 408, 410, 412, 413, 420, 358/468, 486, 488, 497, 505; 382/274, 298, 382/299
See application file for complete search history.

(56) References Cited

U.S. PATENT DOCUMENTS

| | | | | |
|---|---|---|---|---|
| 4,951,160 A * | 8/1990 | Nagahara et al. | ............. | 358/1.7 |
| 5,970,181 A * | 10/1999 | Ohtsu | .......................... | 382/274 |
| 6,144,467 A * | 11/2000 | Tsai | ............................ | 358/486 |
| 6,292,594 B1 * | 9/2001 | Iwai | ........................... | 382/298 |
| 6,348,982 B2 * | 2/2002 | Iseki et al. | .................. | 358/475 |
| 6,353,486 B1 * | 3/2002 | Tsai | ............................ | 358/474 |
| 6,661,541 B1 * | 12/2003 | Chang | ......................... | 358/474 |
| 6,963,429 B2 * | 11/2005 | Suzuki et al. | ............... | 358/474 |
| 7,154,641 B2 * | 12/2006 | Ichikawa | ..................... | 358/483 |
| 2004/0012824 A1 * | 1/2004 | Haas et al. | .................. | 358/474 |
| 2006/0268340 A1 * | 11/2006 | Futami | ...................... | 358/1.16 |
| 2006/0290998 A1 * | 12/2006 | Jung et al. | ............. | 358/426.03 |
| 2007/0058219 A1 * | 3/2007 | Yamaguchi | ................. | 358/497 |
| 2007/0183003 A1 * | 8/2007 | Bae | ............................. | 358/474 |

FOREIGN PATENT DOCUMENTS

| | | |
|---|---|---|
| JP | A-05-284284 | 10/1993 |
| JP | A-05-316305 | 11/1993 |
| JP | A-06-125430 | 5/1994 |
| JP | A-2000-165607 | 6/2000 |
| JP | A-2000-354137 | 12/2000 |
| JP | B2 3162788 | 2/2001 |
| JP | A-2002-271584 | 9/2002 |

* cited by examiner

*Primary Examiner*—Negussie Worku
(74) *Attorney, Agent, or Firm*—Oliff & Berridge, PLC

(57) ABSTRACT

In S1, an image reading device obtains an image region length Ld of an original placed on an original mounting portion, a set moving velocity Vm of an image reading unit, a required deceleration distance Ls, a reference velocity Vr, and an absolute length Z. In S5, the image reading device sets a flag to 0 if Vm≦Vr (S2: NO) or Z≧(Ld+Ls) (S3: YES) and reads the entire image region length while the image reading unit is moving at the set moving velocity Vm. The image reading device sets the flag to 1 if Vm>Vr (S2: YES) and Z<(Ld+Ls) (S3: NO), reads the image region while the image reading unit is moving at the set moving velocity Vm up to the deceleration start position while the distance moved by the image reading unit is less than or equal to (L1+Z−LS) (S17: NO), then if the distance is greater than (L1+Z−Ls) (S17: YES), the image reading unit performs deceleration reading and reads up to a position immediately downstream of the image region.

19 Claims, 10 Drawing Sheets

FIG.6

| FUNCTION | MODE (RESOLUTION IN dpi) | | SET MOVING VELOCITY Vm (mm/sec) | DECELERATION READING ○ YES × NO | NUMBER OF STEPS REQUIRED FOR DECELERATION (steps) | REQUIRED DECELERATION DISTANCE Ls (mm) |
|---|---|---|---|---|---|---|
| SCANNER | MONOCHROME | 200X200 | 120 | ○ | 161 | 6.816 |
| | | 300X300 | 80 | ○ | 72 | 3.048 |
| | | 600X600 | 40 | × | 19 | 0.804 |
| | | 1200X1200 | 20 | × | 5 | 0.212 |
| SCANNER | COLOR | 200X200 | 72 | × | 51 | 2.159 |
| | | 300x300 | 48 | × | 23 | 0.974 |
| | | 600x600 | 12 | × | 2 | 0.085 |
| | | 1200x1200 | 6 | × | 1 | 0.042 |
| COPY | | | 120 | ○ | 161 | 6.816 |
| FACSIMILE | STANDARD MONOCHROME | | 120 | ○ | 161 | 6.816 |
| | FINE MONOCHROME | | 120 | ○ | 161 | 6.816 |
| | PHOTOGRAPH PHOTOGRAPH | | 120 | ○ | 161 | 6.186 |
| | SUPERFINE MONOCHROME | | 60 | × | 41 | 1.736 |

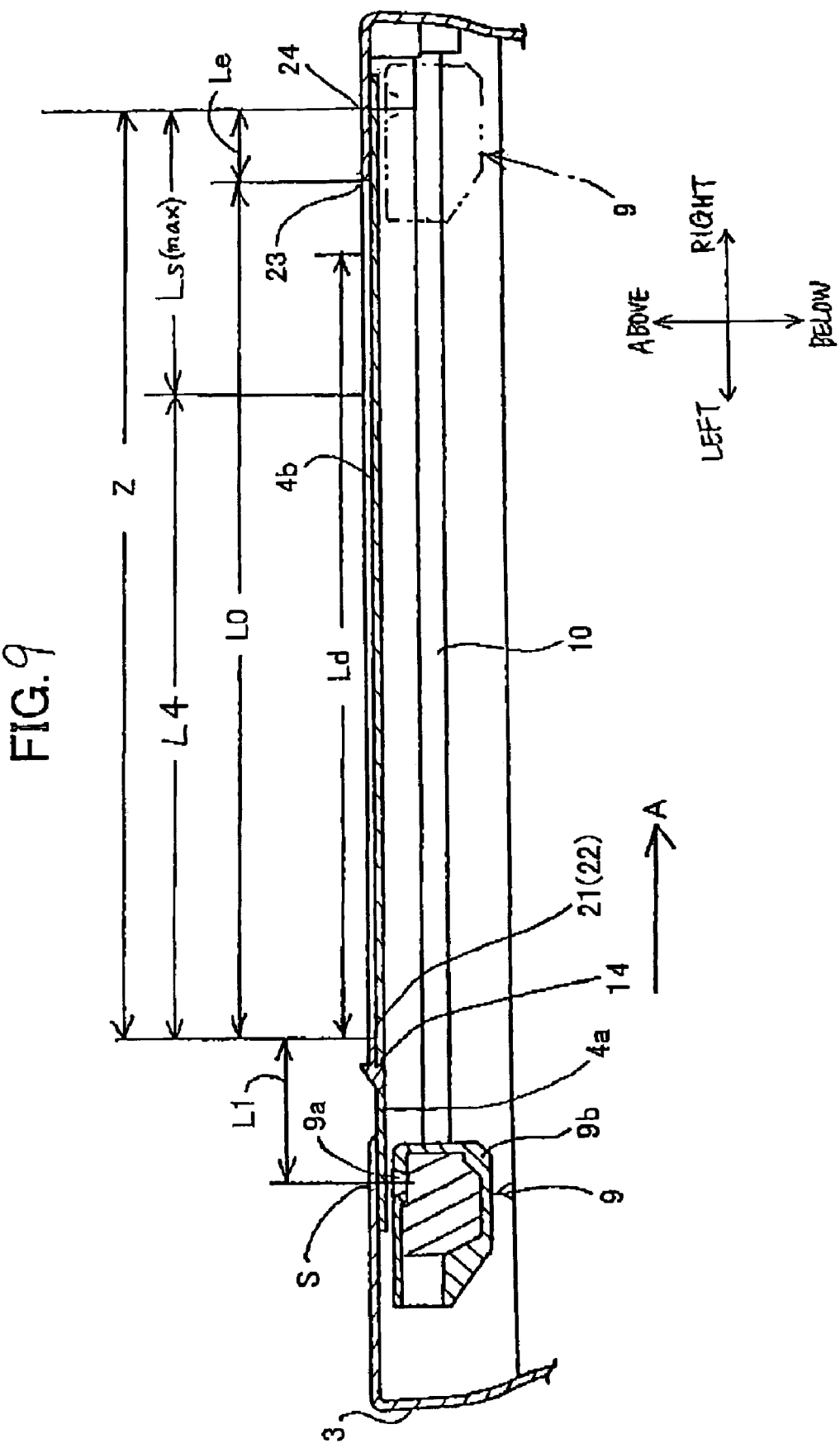

IMAGE READING DEVICE

BACKGROUND OF THE INVENTION

1. Field of the Invention

The present invention relates to an image reading device or a scanning device for reading an image of an original.

2. Description of Related Art

A flat bed type image reading device or scanning device has been known. The image reading device includes an original stand formed of a transparent glass plate for mounting thereon an original, and a scanning unit such as CCD (charge coupled device) disposed below the original stand. The scanning unit initially stopped is accelerated in an image reading direction, and is then moved at a constant speed during which an image of the original is read. After reading the image, the scanning unit is decelerated and stopped at a predetermined position. In other words, an acceleration region, an image reading region, and a deceleration region are provided. The acceleration region is adapted for running up the scanning unit and is positioned upstream of the image reading region where the scanning unit is moved at a constant speed. The deceleration region is positioned downstream of the image reading region for allowing overrunning of the scanning unit. The acceleration region and the deceleration region render the resultant scanning device bulky.

In order to make the scanning device compact, Japanese patent 3,162,788 discloses a technique for reading the image even during the acceleration and deceleration of a scanning unit. To this effect, in accordance with the image reading speed of the scanning unit, the acquired image data is magnified or reduced in order to obtain uniform magnification of the image data that is read in the acceleration region and deceleration region.

SUMMARY OF THE INVENTION

However, in order to read the image during acceleration and deceleration, a complicated reading control is required, and read image quality may be lowered. In this connection, generally, image reading during acceleration and deceleration of the scanning unit should be obviated as much as possible.

On the other hand, a conventional image reading device or scanning device is provided with high speed reading mode with a low resolution in order to meet with the recent high speed processing requirement as well as an ordinary reading mode with a high resolution. In case of the high speed reading mode, image reading is started after the speed of the scanning unit reaches high speed, and deceleration is started after the constant high speed region. Accordingly, increased running up distance and overrunning distance for acceleration and deceleration are required.

Particularly, if high speed reading mode is executed with respect to a relatively large sited original such as A3 size sheet and a legal size sheet, entire device becomes bulky due to the provision of the elongated acceleration region and elongated deceleration region.

It is an object of the present invention to overcome the above-described problems and to provide a compact image reading device capable of performing high speed image reading with respect to a large sized original and capable of restraining degradation of the read image.

In order to attain the above and other objects, the present invention provides an image reading device. The image reading device includes an original mounting portion, an original reading unit, a movement control unit, a velocity setting unit, and a deceleration-start-position setting unit. An original having an image region is placed on the original mounting portion. The original reading unit is movable in a reading direction for reading the image region. The image region has an image region length in the reading direction. The movement control unit controls the original reading unit to provide an acceleration region where the original reading unit accelerates from a halted state to a moving velocity, a constant-velocity region where the original reading unit maintains the moving velocity, and a deceleration region where the original reading unit decelerates from the moving velocity to the halted state. The original reading unit reads the image region at least in the constant-velocity region. The original reading unit starts to decelerate at a deceleration start position that is positioned between the constant-velocity region and the deceleration region. The velocity setting unit sets the moving velocity of the original reading unit based on a specified image reading mode. The deceleration-start-position setting unit sets the deceleration start position based on the moving velocity set by the velocity setting unit.

The present invention also provides an image reading device. The image reading device includes an original mounting portion, an original reading unit, a movement control unit, a region-length acquisition unit, and a deceleration-start-position setting unit. An original having an image region is placed on the original mounting portion. The original reading unit is movable in a reading direction for reading the image region. The image region has an image region length in the reading direction. The movement control unit controls the original reading unit to provide an acceleration region where the original reading unit accelerates from a halted state to a moving velocity, a constant-velocity region where the original reading unit maintains the moving velocity, and a deceleration region where the original reading unit decelerates from the moving velocity to the halted state. The original reading unit reads the image region at least in the constant-velocity region. The original reading unit starts to decelerate at a deceleration start position that is positioned between the constant-velocity region and the deceleration region. The region-length acquisition unit acquires the image region length. The deceleration-start-position setting unit sets the deceleration start position based on the image region length acquired by the region-length acquisition unit.

BRIEF DESCRIPTION OF THE DRAWINGS

In the drawings:

FIG. 6 is a look-up table showing a set moving velocity Vm, with or without deceleration reading, number of steps required for deceleration, and required deceleration distance Ls for a corresponding mode in each function;

FIG. 9 is a cross-sectional view taken along the line III-III of FIG. 2, additionally showing a reference region length L4 and a maximum required deceleration distance Ls(max) that are used in the second embodiment;

DETAILED DESCRIPTION OF THE PREFERRED EMBODIMENTS

An image reading device according to a first embodiment of the present invention will be described with reference to FIGS. 1 through 7(c). The image reading device 2 of the first embodiment is incorporated into a multifunction device 1 provided with a facsimile function, scanner function, copying function, and printing function. Incidentally, throughout the specification, the expressions "front", "rear", "above", "below", "left" and "right" are used herein to define the various parts when the multifunction device 1 is disposed in an orientation in which it is intended to be used.

Figure 1:
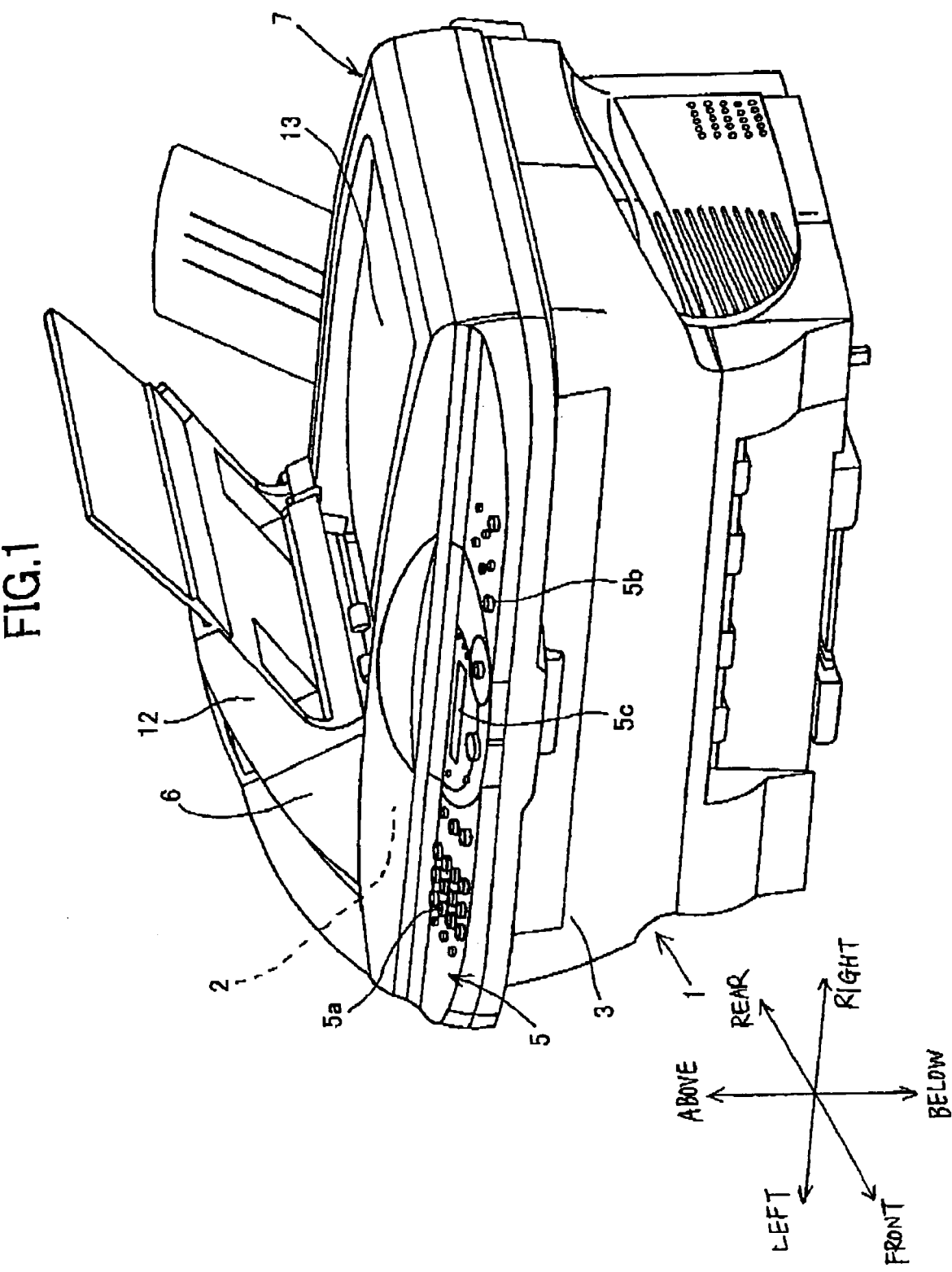
FIG. 1 is a perspective view showing a multifunction device incorporating an image reading device according to embodiments of the present invention.
Figure 2:
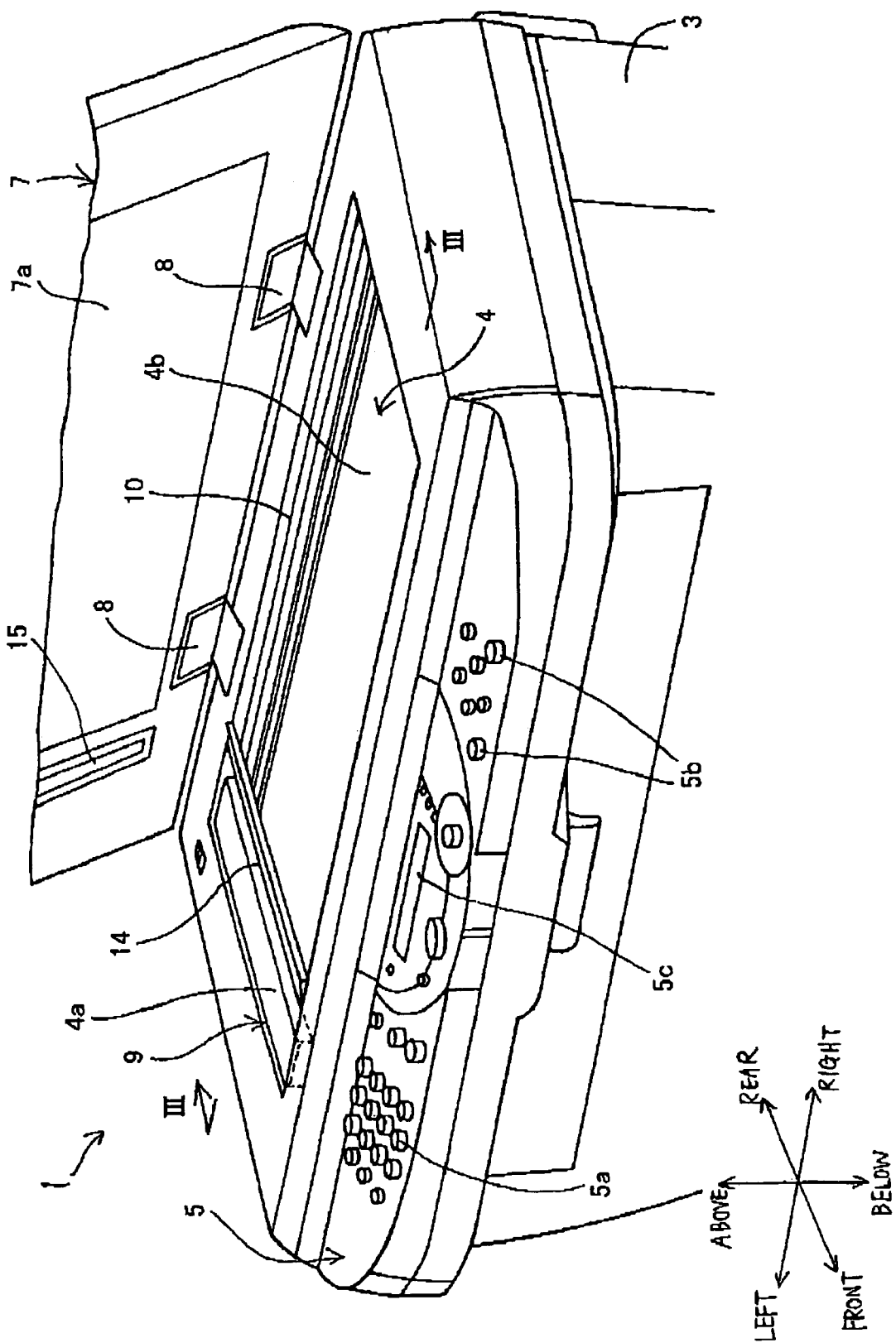
FIG. 2 is a partial perspective view showing the multifunction device in which a cover member is pivotally open with respect to a main casing.

As shown in FIGS. 1 and 2, a large-scale glass plate 4 (FIG. 2) for mounting an original is fixed in a horizontal state on an upper surface of a main casing 3 of the multifunction device 1, and an operating panel 5 is disposed on an upper surface of the main casing 3 in front thereof. The operating panel 5 is provided with a numeric keypad 5a for executing the facsimile function, the scanner function, and the copy functions, buttons 5b for directing various operations, and a liquid-crystal panel (LCD) 5c for displaying information such as direction details and errors. A main lid cover 7 is pivotally supported by hinges 8 (FIG. 2) with respect to a rearward edge of the upper surface of the main casing 3. A pressing body 7a is provided on an under surface of the main lid cover 7. The pressing body 7a is formed of sponge or the like and a white plate.

Figure 3:
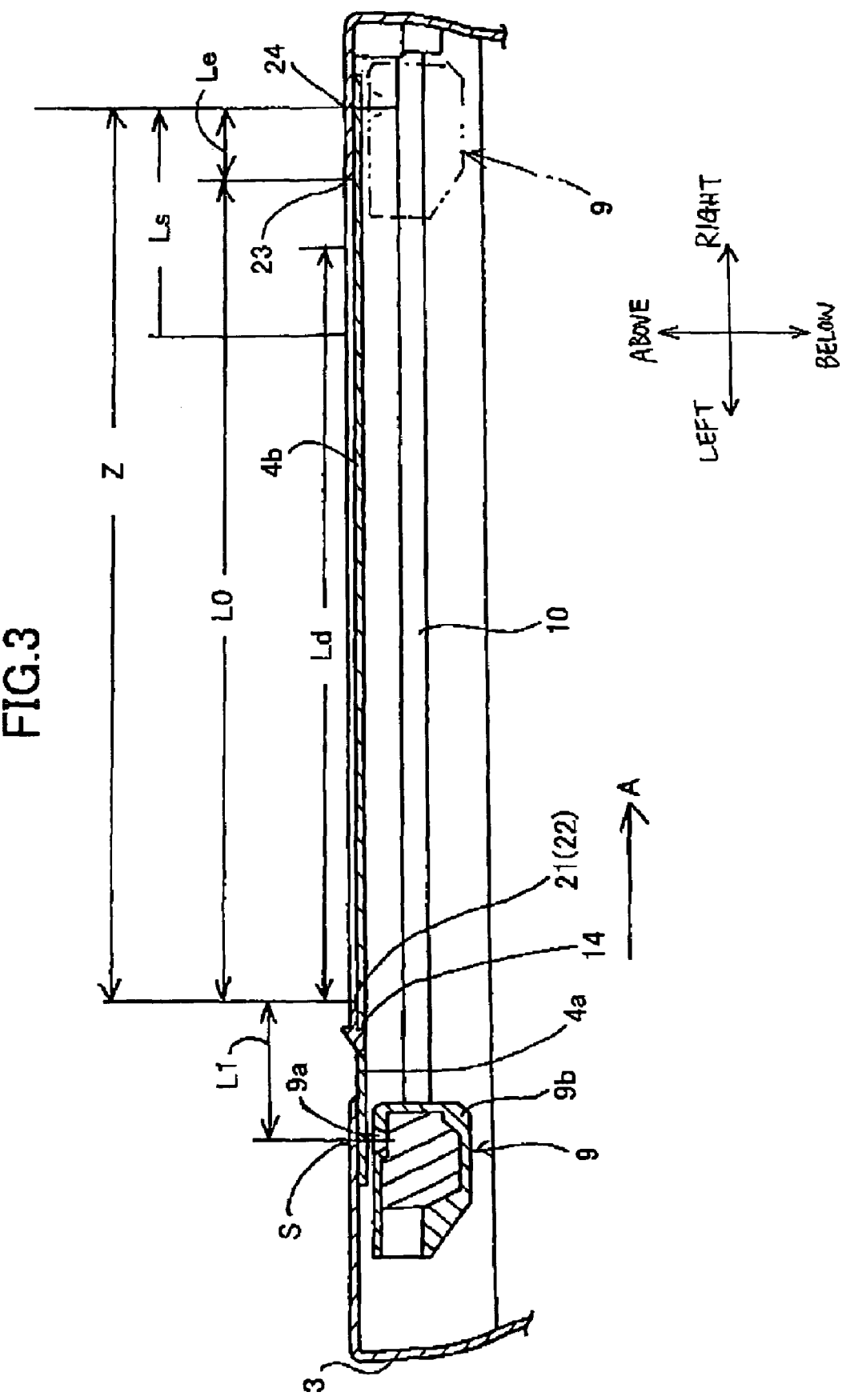
FIG. 3 is a cross-sectional view taken along the line III-III of FIG. 2.

The image reading device 2 implements the above-mentioned scanner function, copy function, and facsimile function. As shown in FIGS. 2 and 3, the image reading device 2 is provided with an image reading unit 9 that moves on a lower-surface side with regard to the large-scale glass plate 4 in the main casing 3, The large-scale glass plate 4 has a rectangular form. A guide piece 14 is attached to the upper surface near one of shorter edges (edges extending in a front-to-rear direction), so as to extend along the shorter edge between longer edges (edges extending in a left-to-right direction). The length of the large-scale glass plate 4 in the longitudinal direction (left-to-right direction) is divided by the guide piece 14 to form an end glass plate 4a that is shorter in a reading direction A (a direction indicated by an arrow A in FIG. 3 and same as the left-to-right direction), and an original mounting portion 4b that is a main glass plate portion that is longer in the reading direction A. An original can be mounted statically on the original mounting portion 4b.

A pair of guide rails 10 is provided in parallel with the reading direction A (only one is shown in FIGS. 2 and 3).

The pair of guide rails 10 is disposed on the lower surface side of the large-scale glass plate 4. The image reading s unit 9 includes a line-type CCD element (not shown) that is installed in a carriage 9b. The carriage 9b is provided to be movable reciprocally on the pair of guide rails 10, and is driven and controlled by a transmission means such as a timing belt and a step motor 59 (see FIG. 4). As shown in FIG. 3, a reading window 9a for receiving light reflected from an original surface is formed in the carriage 9b facing the original surface. When the image reading unit 9 is in a standby state, a center of the reading window 9a is positioned at a movement start position S.

The original placed on the original mounting portion 4b is positioned such that an edge portion of the original on an upstream side in the reading direction A (left-side edge portion) is in contact with a side edge portion on a downstream side (right-side edge portion) of the guide piece 14, in other words, in contact with an original contact edge portion 21. Therefore, when the original is placed on the original mounting portion 4b with the surface thereof on which an image is formed is directed downward and the original is pressed by the pressing body 7a, the image reading unit 9 that was halted on the lower-surface side of the glass plate 4a during the standby state moves in the reading direction A to pass through the lower-surface side of the original mounting portion 4b. During this movement, the line-type CCD element reads the image of the original through the reading window 9a. The halted image reading unit 9 accelerates in a running-up (acceleration) section, reads the image while moving at a predetermined velocity, then decelerates in an overrunning (deceleration) section from a deceleration start position to be described later, and comes to a halted state again.

As shown in FIG. 3, a distance L1 denotes a distance from the movement start position S to a reading start position 22. An absolute length Z denotes a distance from the reading start position 22 to an absolute halt position 24. The absolute halt position 24 is a position that is downstream in the reading direction A, by a distance Le, from the boundary between the large-scale glass plate 4 and the main casing 3. The boundary between the large-scale glass plate 4 and the main casing 3 is referred to as a reading-direction downstream end portion 23. The reading start position 22 is a position at which the image reading unit 9 starts to read the image of the original in a state in which an upstream (left-side) edge of the original is in contact with the original contact edge portion 21 of the guide piece 14. In this embodiment, the upstream edge of the original in contact with the original contact edge portion 21 is the same as the reading start position 22. The absolute halt position 24 is a position at which the image reading unit 9 must halt or stop after having read the image region, because if the image reading unit 9 moves further in the reading direction A the same will come into contact with the wall surface of the main casing 3. The image region is a region of the surface of the original, which is placed as appropriate on the original mounting portion 4b, that ought to be read by the image reading unit 9. An image region length Ld is a length of the image region in the reading direction A. Since the image region is usually the entire original, the image region length Ld is equal to the length of the original. However, if pre-scanning is performed in accordance with an instruction from a personal computer or the like (not shown), and part of the region of the original placed as appropriate has been set as the region to be read by the image reading unit 9, the image region length Ld is a length from the upstream edge of the original in the reading direction A to a position immediately downstream of the set image region. In this case, "placed as appropriate" means that the original is placed on the original mounting portion 4b in a state in which the upstream (left-side) edge portion of the original is in contact with the original contact edge portion 21 of the guide piece 14.

Note that the image reading device 2 is capable of reading not only an original placed on the original mounting portion 4b, but also originals that are supplied automatically. More specifically, originals that have been stacked in an original tray portion 12 (FIG. 1) of an automatic paper supply device 6 provided on one side of the upper surface of the main lid cover 7 are separated one sheet at a time by paper supply rollers (not shown) incorporated within the automatic paper supply device 6. The originals are then transferred by feed rollers (not shown). Subsequently, the image reading unit 9 that is stationary or in a halted state on the lower surface side of the glass plate 4a reads the image on each original sequentially, by exposing portions of the original sequentially through an opening portion 15 (FIG. 2) that is in opposition to the glass plate 4a. The original is subsequently fed along a paper delivery path (not shown) within the automatic paper supply device 6 by guides of the guide piece 14, and is delivered into a paper delivery tray portion 13 (FIG. 1). The configuration and operation of the automatic paper supply device 6 are known in the art and are not directly related to explanation of the present embodiment, so further description thereof is omitted herein.

Figure 4:
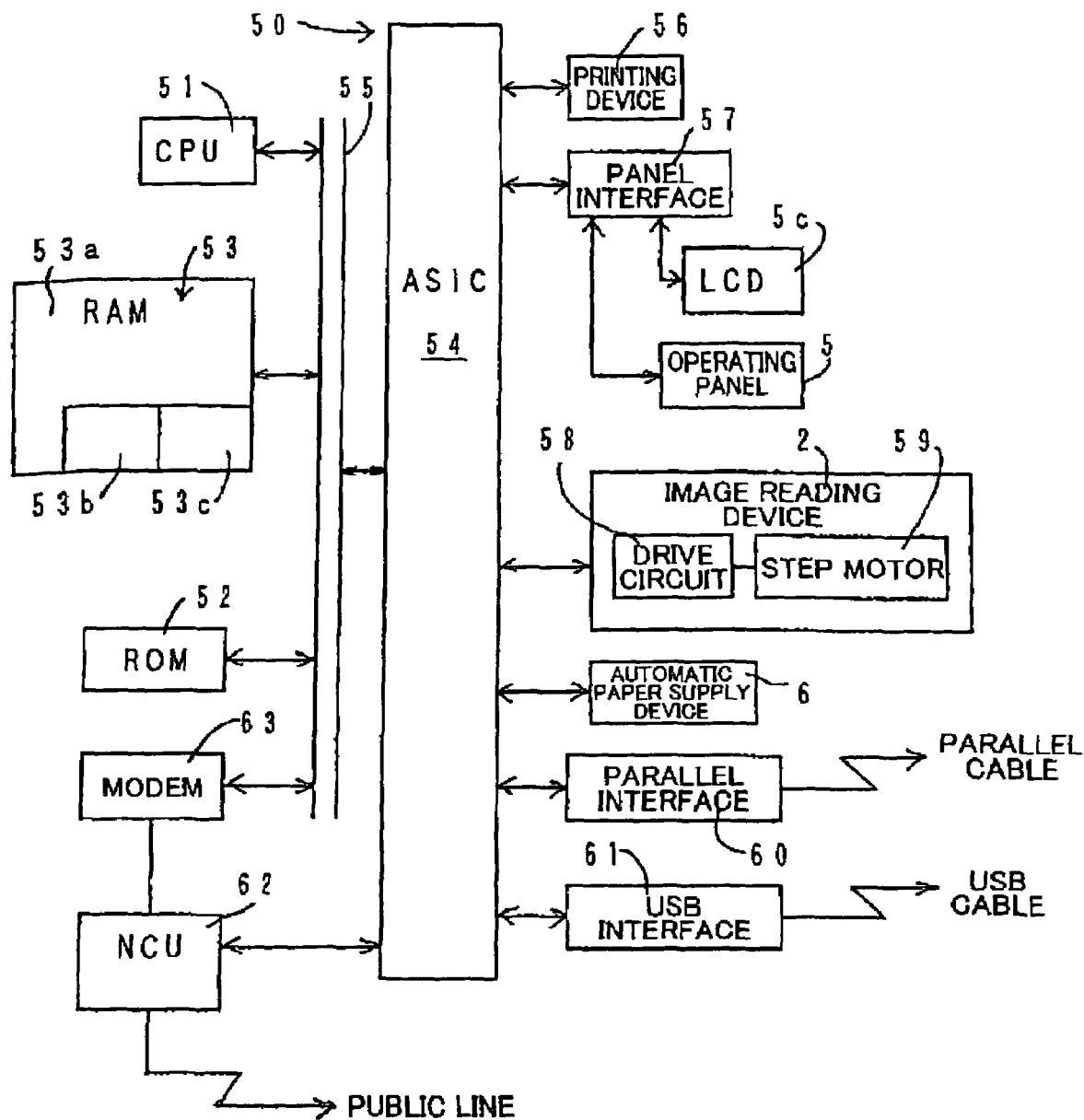
FIG. 4 is a block diagram showing a control unit of the multifunction device according to the embodiments.

A control unit 50 of the image reading device 2 is described with reference to a block diagram of FIG. 4. The control unit 50 controls movement of the image reading unit 9 and reading of the image region. The control unit 50 is a microcomputer including a CPU 51, a ROM 52, a RAM 53, and an ASIC (application-specific integrated circuit) 54. In addition to the operations described above, the control unit 50 controls the entire operation of the multifunction device 1. The CPU 51 executes various calculations and implements controls. The ROM 52 stores programs and parameters necessary for control by the CPU 51, together with a look-up table as shown in FIG. 6. The RAM 53 has a storage region 53a for storing the read-in image data, a storage region 53b for storing various data items such as the size of the original (the length of the original in the reading direction A), the image region length, and image reading modes, and a flag storage area 53c for storing a value of a flag. The CPU 51, ROM 52, RAM 53, and ASIC 54 are all connected together by a bus 55.

Note that the data within the above-mentioned look-up table is written temporarily to the RAM 53 before being utilized in calculations or the like. Data of the distance L1 and the absolute length Z are also stored in the ROM 52 beforehand and written to the RAM 53 before being utilized.

The control unit 50 further includes a printing device 56, a panel interface 57 for the operating panel 5 and liquid-crystal panel 5c, a drive circuit 58 for driving the step motor 59 that moves the image reading unit 9, the automatic paper supply device 6, a parallel interface 60 for inputting and outputting image information to and from an external personal computer (PC) or the like (not shown), a USB interface 61 for inputting and outputting image information to and from an external device such as a digital camera, a network control unit (NCU) 62 for transferring information to and from an external facsimile machine through a public line, and a modem 63, all of which are connected to the ASIC 54. An external PC could also be connected through the USB interface 61.

Figure 5:
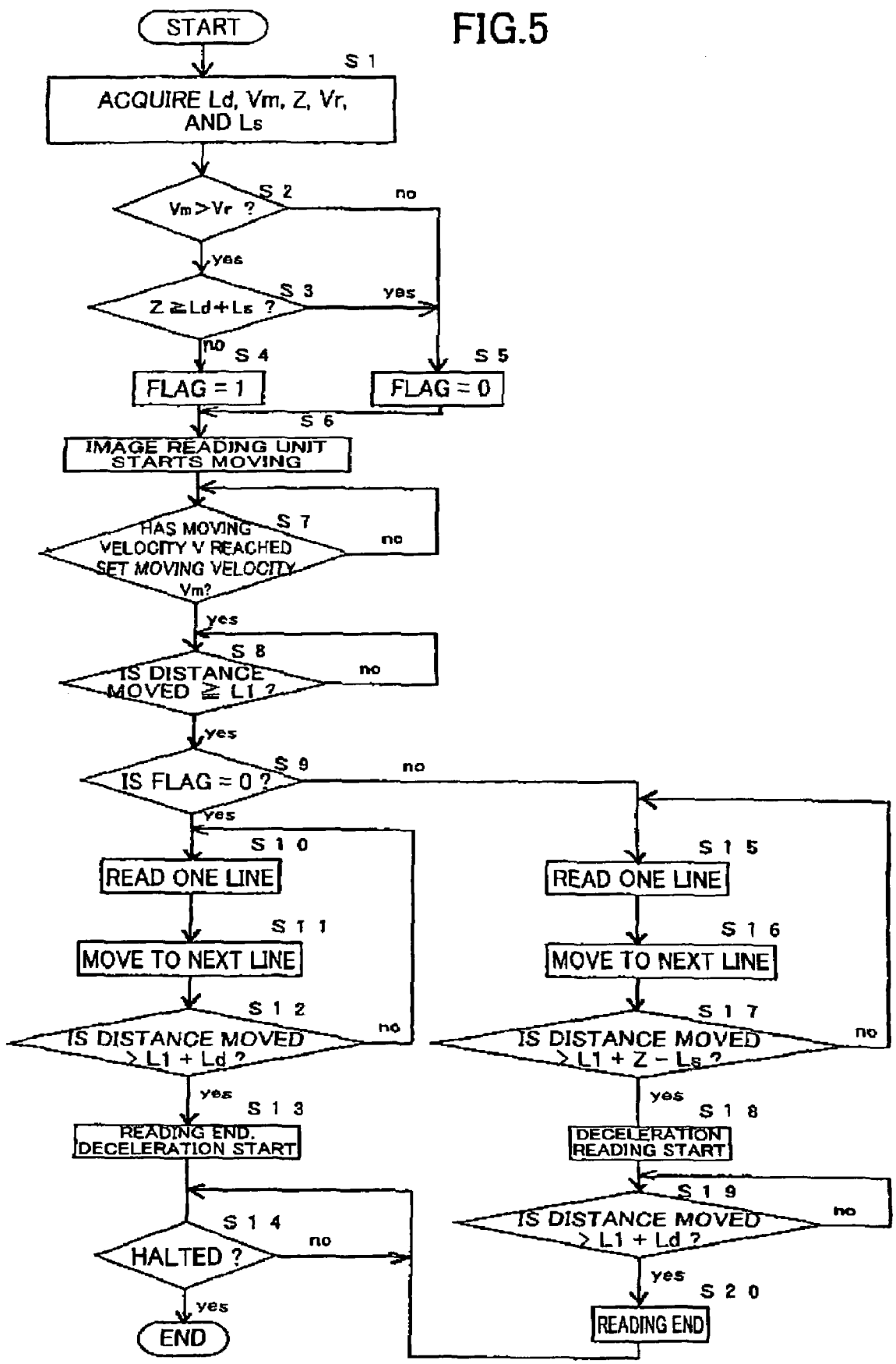
FIG. 5 is a flowchart showing a reading control routine according to a first embodiment of the present invention.
Figure 7A:
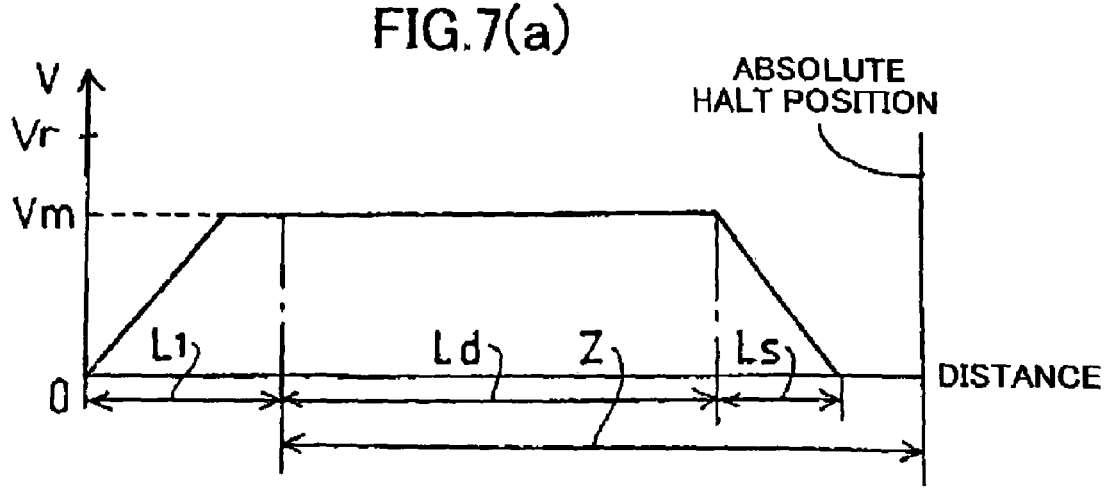
FIG. 7(*a*) is a graphical representation showing a speed control pattern in case where a set moving velocity Vm is less than or equal to a reference velocity Vr.
FIG. 7(b) is a graphical representation showing a speed control pattern in case where the set moving velocity Vm is greater than the reference velocity Vr and a sum of an image region length Ld and a required deceleration distance Ls is less than an absolute length Z.
FIG. 7(c) is a graphical representation showing a speed control pattern in case where the set moving velocity Vm is greater than the reference velocity Vr and the sum of the image region length Ld and the required deceleration distance Ls is greater than the absolute length Z.
Figure 7B:
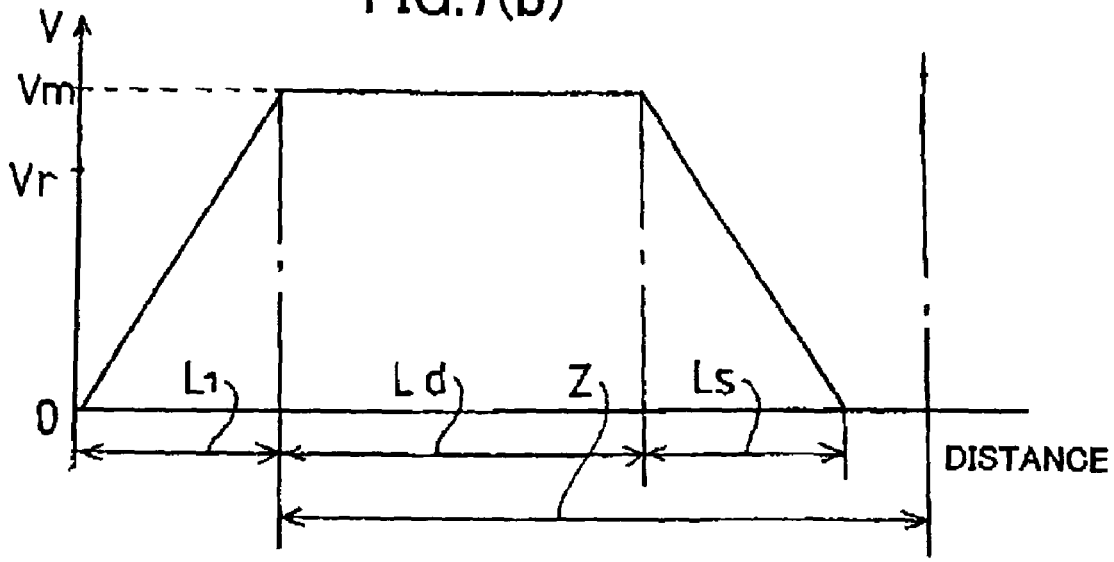
Figure 7C:
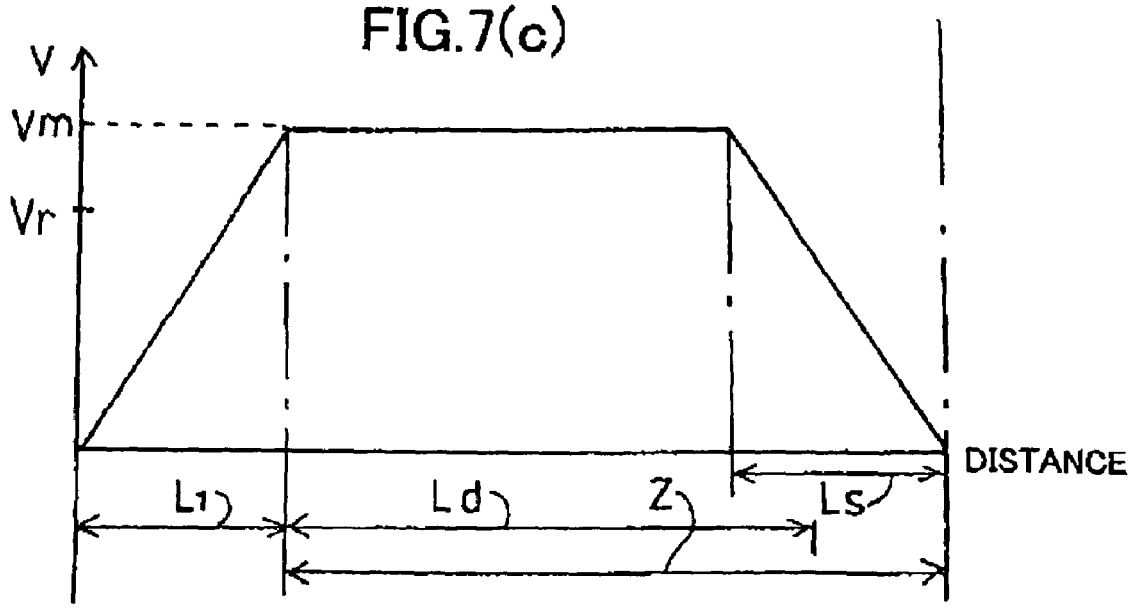

A reading control operation by the image reading device 2 according to the first embodiment will be described with reference to a flowchart of FIG. 5.

In order to issue an image reading instruction, a user first specifies the image region length Ld and the image reading mode, by operating buttons on the operating panel 5. upon this operation, in Step S1 (Step is hereinafter referred to as "S") the ASIC 54 performs calculations and references the above-mentioned look-up table that is read from the ROM 52 and stored in the RAM 53. The ASIC 54 sets a set moving velocity Vm (mm/sec) of the image reading unit 9 and a required deceleration distance Ls. The required deceleration distance Ls is a distance that is necessary for the image reading unit 9 to reach a halt state from the start of deceleration from the set moving velocity Vm.

The image reading mode includes modes that correspond to the scanner function, the copy function, and the facsimile function. As shown in the look-up table of FIG. 6, if the scanner function is to be executed and the original is to be read as monochromatic data, the resolution (dpi) modes of 200×200, 300×300, 600×600, and 1200×1200 are available. The set moving velocity Vm (mm/sec) corresponding to each mode is 120, 80, 40, and 20, respectively.

Similarly, if the reading by the scanner function is to be as full-color data, the resolution (dpi) modes of 200×200, 300×300, 600×600, and 1200×1200 are available. The set moving velocity Vm (mm/sec) corresponding to each mode is 72, 48, 12, and 6, respectively.

With the copy function, which has one mode, there is only one set moving velocity Vm which is 120 (mm/sec), in this example.

With the facsimile function, the user can select four modes (standard mode, fine mode, photograph mode, or superfine mode) for sending monochromatic data. The set moving velocity Vm (mm/sec) corresponding to each mode is 120, 120, 120, or 60, respectively.

If the user has specified the size (the length in the reading direction A) of the original itself, the image region length Ld is equal to the total length of the original. If the user has specified an arbitrary reading region through an external device such as an external PC by a pre-scanning operation, the image region length Ld is equal to the arbitrary reading region. Data on the required deceleration distance Ls and the image region length Ld is stored in the RAM 53.

Note that the distance L1 from the movement start position S to the reading start position 22, the absolute length Z that is the distance from the reading start position 22 to the absolute halt position 24, and a reference velocity Vr are known design values and data for those values is also stored beforehand in the RAM 53. The reference velocity Vr is the moving velocity of the image reading unit 9 that enables the image reading unit 9 to stop without performing any deceleration reading. In other words, the image reading unit 9 starts deceleration after having read the entire image region at a uniform velocity and the image reading unit 9 can stop before or at the absolute halt position 24, even if the image region has a maximum length. The maximum length is a length when an original having a maximum length Lmax that can be placed on the original mounting portion 4b and also the image region is the entire original. The deceleration reading means reading of the image of the original while the image reading unit 9 is decelerating from the set moving velocity Vm. The deceleration start position is a position at which the image reading unit 9 starts deceleration from the set moving velocity Vm to reach a halted state.

The maximum length Lmax is set to be slightly shorter than a distance between the reading start position 22 and a reading-direction downstream end portion 23 of the large-scale glass plate 4, in order to facilitate removal of the original from the original mounting portion 4b. The reading-direction downstream end portion 23 is an end portion of the original mounting portion 4b that is exposed on the upper surface thereof.

In S1, as described above, when the user specifies the image region length Ld and the image reading mode, the ASIC 54 stores the image region length Ld and the image reading mode in the RAM 53. Then, when the start button of the operating panel 5 is pressed, the ASIC 54 references the look-up table of FIG. 6 and acquires the image region length Ld, the set moving velocity Vm, the absolute length Z, the reference velocity Vr, and the required deceleration distance Ls from the RAM 53. Note that the reference velocity Vr is set to 75 (mm/sec) in the present embodiment.

In S2, the ASIC 54 determines whether or not the set moving velocity Vm is greater than the reference velocity Vr. If the set moving velocity Vm is greater than the reference velocity Vr (S2: YES), in S3 the ASIC 54 determines whether or not the absolute length Z is greater than or equal to a sum of the image region length Ld and the required deceleration distance Ls (Z≧Ld+Ls). If the ASIC 54 determines that the absolute length Z is smaller than the sum of the image region length Ld and the required deceleration distance Ls (S3: NO), in S4 the ASIC 54 stores a value of 1 in the flag storage area 53c in the RAM 53. If the ASIC 54 determines that the absolute length Z is greater than or equal to the sum of the image region length Ld and the required deceleration distance Ls (S3: YES), in S5 the ASIC 54 stores a value of 0 in the flag storage area 53c. After the ASIC 54 has determined the value of the flag in this manner, in S6 the drive circuit 58 drives the step motor 59 and starts the movement (acceleration) of the image reading unit 9.

In S7, the ASIC 54 determines whether or not the moving velocity V of the image reading unit 9 has reached the set moving velocity Vm. If the moving velocity V has not reached the set moving velocity Vm (S7: NO), the image reading unit 9 continues to accelerate. If the moving velocity V has reached the set moving velocity Vm (S7: YES), the ASIC 54 determines that the moving velocity V of the image reading unit 9 is at a predetermined constant moving velocity and moves on to S8. In S8, the ASIC 54 determines whether or not the distance moved from the halt position of the image reading unit 9 is greater than or equal to the distance L1. If the distance moved from the halt position of the image reading unit 9 is smaller than the distance L1 (S8: NO), the image reading unit 9 has not reached the reading start position 22 and repeats processing of S8. If the distance moved from the halt position of the image reading unit 9 is greater than or equal to the distance L1 (S8: YES), the image reading unit 9 has reached the reading start position 22 and thus the reading operation can start.

In S9, the ASIC 54 determines whether or not the flag stored in the flag storage area 53c has a value of 0. When the result of S2 is NO, the flag is set to 0 in S5. In other words, if the set moving velocity Vm is less than or equal to the reference velocity Vr (see FIG. 7(a)), the flag is set to 0. If a high resolution (600×600 or 1200×1200 dpi) in monochrome mode or any resolution in color mode is selected for the scanner function, or superfine is selected for the facsimile function, for example, the control unit 50 performs a low-speed reading operation at a moving velocity slower than the reference velocity Vr. In this case, the required deceleration distance Ls will naturally be short, as shown in FIG. 6.

On the other hand, if the set moving velocity Vm is faster than the reference velocity Vr (S2: YES) and the absolute length Z is greater than or equal to the value (Ld+Ls) (S3: YES), in S5 the ASIC 54 sets the flag to 0. In other words, even if the value of the required deceleration distance Ls is large in S3, when the image region length Ld is short (S3; YES), the control unit 50 performs the reading while the image reading unit 9 is moving at a constant moving velocity (the set moving velocity Vm) over the entire image region length Ld (see FIG. 7(b)). Even if the deceleration starts at a position immediately downstream of the image region, the image reading unit 9 can stop before or at the absolute halt position 24. In this case (when the flag is 0), therefore, the control unit 50 performs control to start deceleration after the reading operation in S13 (see FIGS. 7(a) and 7(b)).

While the image reading unit 9 is moving at the constant moving velocity (the set moving velocity Vm), in S10 the ASIC 54 reads the image for one line in a direction perpendicular to the reading direction A, in S11 moves to the next line, and in S12 determines whether or not the distance moved by the image reading unit 9 has exceeded a distance (L1+Ld) which is a sum of the distance L1 and the image region length Ld. This means that the reading center of the reading window 9a of the image reading unit 9 has passed a position immediately downstream of the image region. The position immediately downstream of the image region means a position immediately downstream of a downstream edge (right-side edge) of the image region. In the present embodiment, the image region also includes the downstream edge of the image region. If the distance moved by the image reading unit 9 has not exceeded the distance (L1+Ld) (S12: NO), the ASIC 54 returns to processing of S10 and repeats processing of S10 through S12 until the ASIC 54 completes the reading operation of the entire image region.

If the image reading unit 9 has passed a position immediately downstream of the image region (S12: YES), in S13 the ASIC 54 stops the image reading and also decelerates the image reading unit 9 from the set moving velocity Vm. Thus, the deceleration start position of S13 approximately matches the downstream end of the image region length Ld (the downstream edge of the image region). When the moving velocity of the image reading unit 9 reaches 0 (S14: YES), the ASIC 54 ends the reading operation.

As described above, the ASIC 54 sets the flag to 1 in S4 when the set moving velocity Vm is faster than the reference velocity Vr (S2: YES) and also the absolute length z is shorter than the length (Ld+Ls) (S3: NO). For example, as can be seen from the look-up table of FIG. 6, if a low resolution (200×200 or 300×300 dpi) in monochrome mode is selected for the scanner function, the set moving velocity Vm is 120 or 80 (mm/sec). Similarly, for the copy function and each of the standard mode, fine mode, and photograph mode of the facsimile function, the set moving velocity Vm is 120 (mm/sec) which is faster than the reference velocity Vr (the reference velocity Vr is set to 75 mm/sec in this embodiment) The image reading unit 9 must halt at the absolute halt position 24 even if the set moving velocity Vm is fast and the image region length Ld is long. Accordingly, when the ASIC 54 has determined that the flag is 1 (S9: NO), the ASIC 54 performs the deceleration reading operation that starts from an appropriate position within the image region.

In S15, the image reading unit 9 reads one line in the direction perpendicular to the reading direction A, then in S16 moves to the next line. In S17, the ASIC 54 determines whether or not the distance moved by the image reading unit 9 has exceeded a distance (L1+Z−Ls). If the distance moved by the image reading unit 9 is less than or equal to the distance (L1+Z−Ls) (S17: NO), the image reading unit 9 performs the image reading by repeating S15 through S17 while moving at the constant moving velocity, that is, the set moving velocity Vm. When the distance moved by the image reading unit 9 exceeds the distance (L1+Z−Ls) (S17: YES), in S18 the image reading unit 9 performs the operation of reading the image in the image region while decelerating the image reading unit 9 (deceleration reading operation). The deceleration reading operation is performed while the distance moved by the image reading unit 9 has not exceeded a distance (L1+Ld) (S19: NO), and the reading ends when the distance moved has exceeded the distance (L1+Ld) (S19: YES) However, when the image region length Ld is equal to a length that is obtained by subtracting the required deceleration distance Ls from the absolute length Z (Ld=Z−Ls), the image reading unit 9 starts decelerating immediately after reading the image of the image region length Ld at the set moving velocity Vm. In this case, the image reading unit 9 can halt at the absolute halt position 24. Thus, the size of the image reading unit 9 can be reduced.

The deceleration reading can be performed by applying known techniques. For example, image data with the same magnification as the image data obtained during constant velocity reading can be obtained by changing the timing at which the image reading unit 9 reads each line of the image in accordance with the number of steps of the step motor 59 during the deceleration.

As shown in FIG. 7(*a*), if the specified image reading mode is a low-speed reading mode (if the set moving velocity Vm is slower than the reference velocity Vr, such as when reading of an original at a high resolution), the image reading device 2 performs the reading operation at a constant velocity of the set moving velocity Vm up to a position immediately downstream of the image region and the image reading device 2 does not perform deceleration reading during the subsequent deceleration motion. Not only can a high image quality be maintained, the image reading unit 9 can be halted accurately before the absolute halt position 24 since the required deceleration distance Ls is short. Thus, the size of the image reading unit 9 can be reduced.

Note that, as the specified set moving velocity Vm becomes slower, the corresponding required deceleration distance Ls becomes shorter. Accordingly, it becomes possible to increase the maximum value of the image region length Ld that can be read.

As shown in FIG. 7(*b*), if the specified image reading mode is a high-speed reading mode (if the set moving velocity Vm is faster than the reference velocity Vr, such as when reading an original at a low resolution), the image reading device 2 performs the reading operation at the constant velocity of the set moving velocity Vm up to a position immediately downstream of the image region, because the maximum value of the image region length Ld satisfies an inequality Ld≦Z−Ls. The image reading device 2 does not perform deceleration reading during the subsequent deceleration motion. Accordingly, the image reading device 2 can read the image quickly and also ensures that the image reading unit 9 is halted accurately before the absolute halt position 24, thus making the size of the image reading device 2 smaller.

As shown in FIG. 7(*c*), if the specified image reading mode is a high-speed reading mode (if the set moving velocity Vm is faster than the reference velocity Vr, such as when reading an original at a low resolution) and also the image region length Ld is large (Ld>Z−Ls), the image reading unit 9 reads a large part of the image region while the image reading unit 9 is moving at the constant velocity of the set moving velocity Vm and then the image reading unit 9 performs deceleration reading on a remaining part of the image region. In this case, since a high-speed reading (low resolution) mode is specified, any deterioration in the image quality due to deceleration reading occurs only when reading in the low-resolution mode is performed. Hence, the portion with deteriorated image quality is not obvious or does not stand out. Furthermore, since the image reading unit 9 is halted accurately at the absolute halt position 24, the size of the image reading device 2 can be made smaller.

With the image reading device 2 according to the first embodiment, it is possible to set the moving velocity of the image reading unit 9 automatically provided that the image reading mode has been specified, to determine the deceleration start position according to each mode including image reading of an original that has a large image region or high-speed image reading, and to enable the image reading unit 9 to halt always before or at the absolute halt position 24. Accordingly, the image reading device 2 and the multifunction device 1 can be configured in a smaller size.

The image reading device 2 can automatically determine whether the deceleration start position should be a position within the image region or a position immediately downstream of the image region, based on the image region length Ld and a comparison result between the reference velocity Vr and the set moving velocity Vm that has been set according to the image reading mode when the user specifies the image region length Ld.

The image reading device 2 can maintain a high image reading quality because, if the specified image reading mode is a high-resolution mode (in other words, a low-speed reading mode at the set moving velocity Vm that is slower than the reference velocity Vr), the image reading device 2 performs the reading at a constant moving velocity up to a position immediately downstream of the image region and does not perform any reading during the subsequent deceleration motion.

The image reading device 2 is capable of determining the required deceleration distance Ls in accordance with the set moving velocity Vm. The required deceleration distance Ls becomes shorter as the set moving velocity Vm becomes slower. Thus, the maximum value of the image region length Ld that can be read is increased.

The image reading device 2 has the plurality of modes for the scanner, facsimile, and copy functions. Accordingly, the user can quickly obtain read data of a desired image quality, simply by specifying each mode for the various functions.

An image reading device according to a second embodiment of the present invention will be described with reference to FIGS. 8 through 10(*c*), wherein like parts and components are designated by the same reference numerals to avoid duplicating description.

In the above-described first embodiment, the ASIC 54 sets the deceleration start position based on both the set moving velocity Vm corresponding to each reading mode and the image region length Ld, and determines whether or not the deceleration reading operation should be performed. In the second embodiment, the ASIC 54 sets the deceleration start position based on the image region length Ld, and determines whether or not the deceleration reading operation should be performed.

Figure 8:
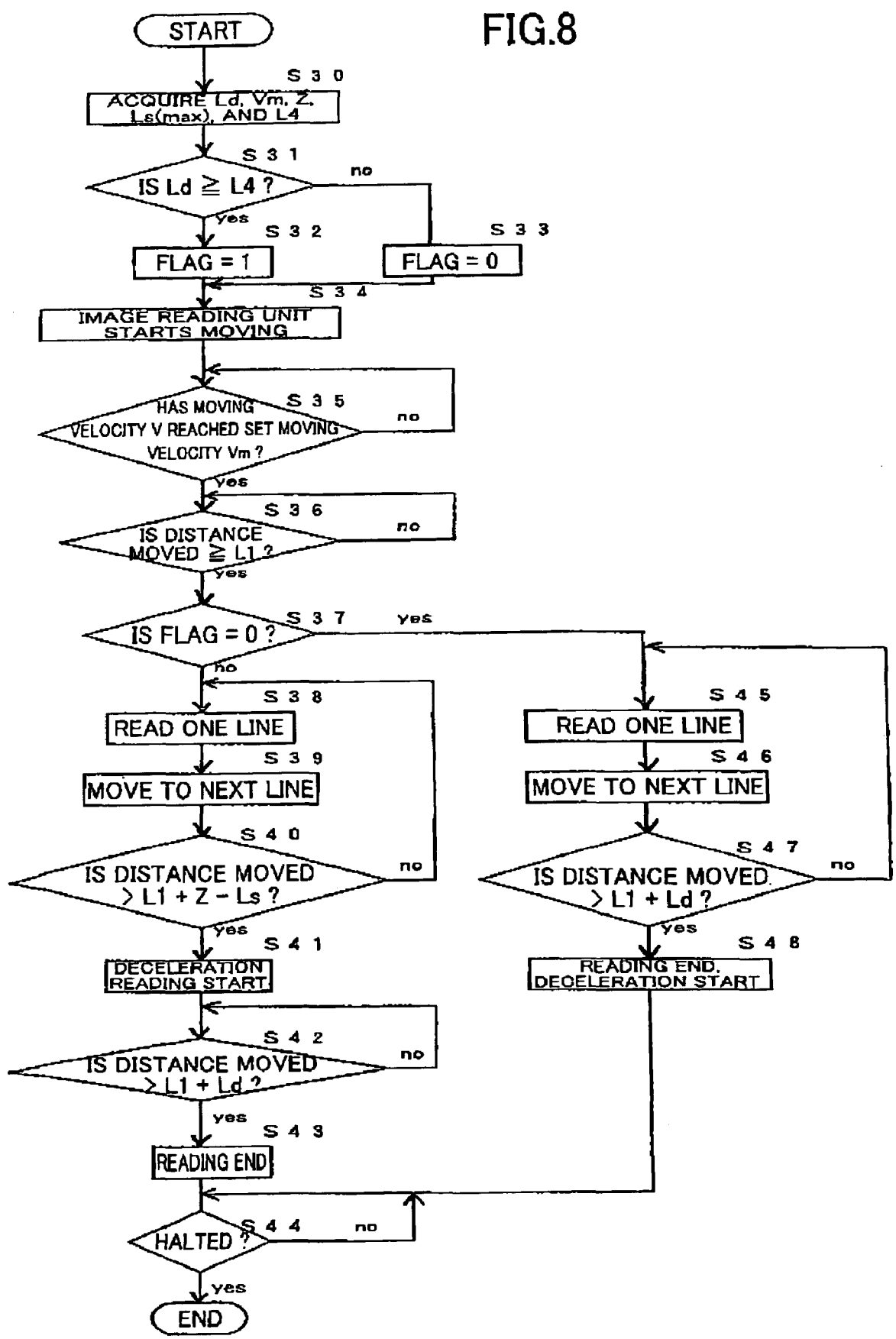
FIG. 8 is a flowchart showing a reading control routine according to a second embodiment of the present invention.

In S30 of a flowchart of FIG. 8, when the user has specified the image region length Ld based on the size of the original and a range of the image region specified during a pre-scanning operation, the ASIC 54 stores the image region length Ld in the RAM 53. Subsequently, when the user has pressed the start button on the operating panel 5, the ASIC 54 acquires the image region length Ld, the set moving velocity Vm, the absolute length Z, a maximum required deceleration distance Ls(max), and a reference region length L4 from the RAM 53 with reference to the above-described look-up table.

As shown in FIG. 9, the reference region length L4 is a length obtained by subtracting the maximum required deceleration distance Ls(max) from the absolute length Z. The maximum required deceleration distance Ls(max) is the required deceleration distance Ls when the image reading unit 9 moves at a maximum moving velocity. In other words, the reference region length L4 is given by an equation L4=Z−Ls(max). The maximum moving velocity is the maximum of the moving velocities of the image reading unit 9 that correspond to a plurality of image reading modes in the scanner function, the copy function, and the facsimile function. With the present embodiment, as shown in the look-up table of FIG. 6, the set moving velocity Vm of 120 (mm/sec) is the maximum moving velocity, and the required deceleration distance Ls in that case is 6.816 mm. Thus, the maximum required deceleration distance Ls(max) is 6.816 mm. The maximum set moving velocity Vm and the maximum required deceleration distance Ls(max) are stored beforehand in the RAM 53. Note that the absolute length Z is the distance from the reading start position 22 to the absolute halt position 24, as in the first embodiment.

In S31, the ASIC 54 determines whether or not the image region length Ld is greater than or equal to the reference region length L4. If the image region length Ld is greater than or equal to the reference region length L4 (S31: YES), the ASIC 54 determines that the deceleration reading operation is necessary, and in S32 the ASIC 54 stores a value of 1 in the flag storage area 53c of the RAM 53. If the image region length Ld is shorter than the reference region length L4 (S31: NO), the ASIC 54 determines that the deceleration reading operation is not necessary, and in S33 the ASIC 54 stores a value of 0 in the flag storage area 53c of the RAM 53. After the ASIC 54 has set the value of the flag in this manner, in S34 the ASIC 54 starts the movement (acceleration) of the image reading unit 9 by controlling the drive circuit 58 to drive the step motor 59.

In S35, the ASIC 54 determines whether or not the moving velocity V of the image reading unit 9 has reached the set moving velocity Vm. If the moving velocity V has not reached the set moving velocity Vm (S35: NO), the image reading unit 9 continues to accelerate. If the moving velocity V of the image reading unit 9 has reached the set moving velocity Vm (S35: YES), the ASIC 54 advances to S36. In S36, the ASIC 54 determines whether or not the distance moved from the halt position is greater than or equal to L1, in other words, whether the image reading unit 9 has reached the reading start position 22. If the image reading unit 9 has not reached the reading start position 22 (S36; NO), the ASIC 54 repeats processing of S36. If the image reading unit 9 has reached the reading start position 22 (S36: YES), the ASIC 54 advances to S37.

Figure 10A:
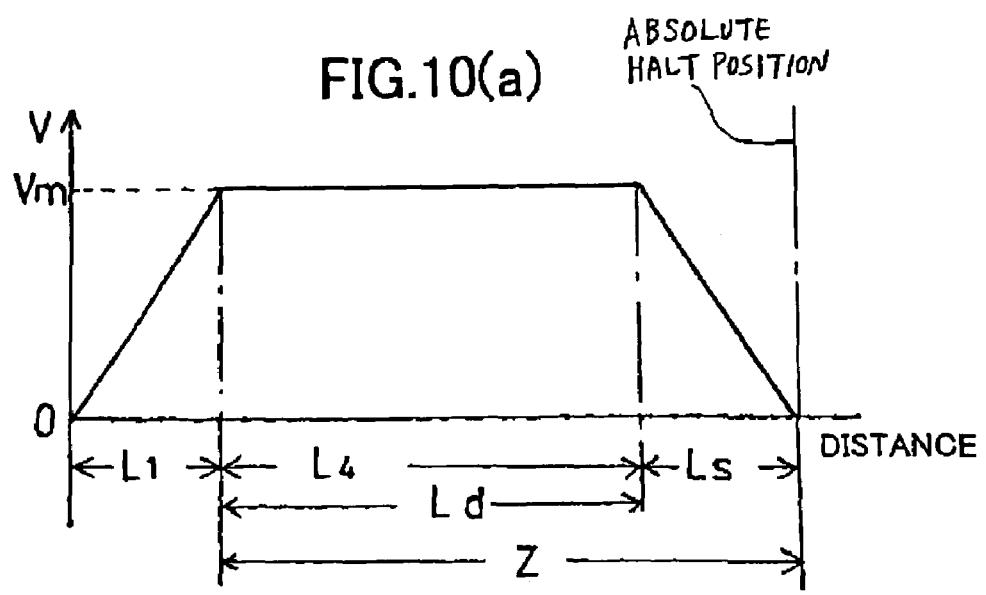
FIG. 10(a) is a graphical representation showing a speed control pattern in case where the image region length Ld is equal to a reference region length L4.
Figure 10B:
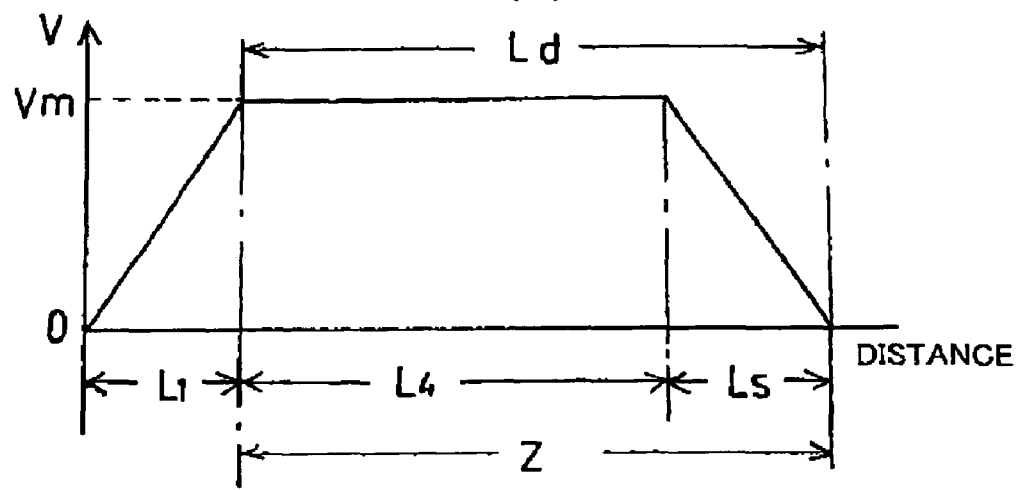
FIG. 10(b) is a graphical representation showing a speed control pattern in case where the image region length Ld is greater than the reference region length L4.

In S37, the ASIC 54 determines whether or not the flag stored in the flag storage area 53c is 0. If the flag has a value of 1 (S37: NO), the deceleration reading operation is necessary. As shown in FIGS. 10(a) and 10(b), two cases can be considered when the deceleration reading operation is necessary. One case is when the image region length Ld is equal to the reference region length L4, as shown in FIG. 10(a). Another case is when the image region length Ld is longer than the reference region length L4, as shown in FIG. 10(b).

In these cases, in S38 the ASIC 54 reads the image for one line in the direction perpendicular to the reading direction A, and in S39 moves to the next line. In S40, the ASIC 54 determines whether or not the distance moved by the image reading unit 9 has exceeded a distance (L1+Z−Ls). If the distance moved by the image reading unit 9 is less than or equal to the distance (L1+Z−Ls) (S40: NO), the image reading unit 9 repeats the image reading (S38 and S39) while moving at the constant moving velocity, that is, at the set moving velocity Vm. If the distance moved by the image reading unit 9 is greater than the distance (L1+Z−Ls) (S40: YES), the image reading unit 9 starts the deceleration reading operation in S41. In other words, the image reading unit 9 performs the operation of reading the image within the image region while decelerating. In S42, the ASIC 54 determines whether or not the distance moved by the image reading unit 9 is greater than the distance (L1+Ld). The ASIC 54 performs the deceleration reading operation while the distance moved by the image reading unit 9 is shorter than or equal to the distance (L1+Ld) (S42: NO). When the distance moved by the image reading unit 9 exceeds the distance (L1+Ld) (S42: YES), in S43 the reading operation ends. However, when the image region length Ld is equal to the reference region length L4 (Ld=L4), the image reading unit 9 simply performs image reading of the image region length Ld while moving at the set moving velocity Vm, then starts decelerating at a position immediately downstream of the image region.

Accordingly, even if the image region length Ld is greater than or equal to the reference region length L4, the image reading unit 9 can stop accurately at the absolute halt position 24 by performing the deceleration reading operation. Hence, the image reading device 2 can be made in a compact configuration.

Figure 10C:
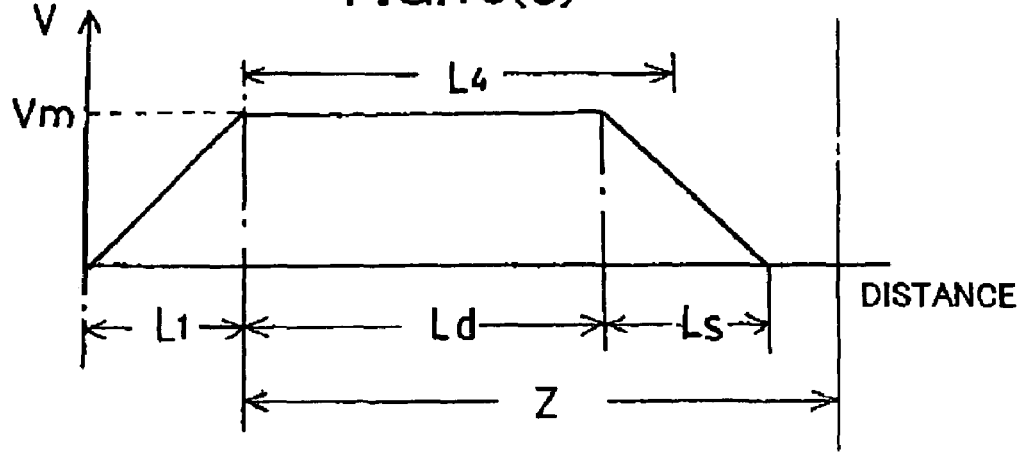
FIG. 10(c) is a graphical representation showing a speed control pattern in case where the image region length Ld is less than the reference region length L4.

On the other hand, as shown in FIG. 10(c), if the flag is 0 (that is, if the image region length Ld is shorter than the reference region length L4), the image reading device 2 does not perform the deceleration reading operation. Thus, in S45 the ASIC 54 reads the image for one line in the direction perpendicular to the reading direction A, while the image reading unit 9 is moving at the constant moving velocity, that is, at the set moving velocity Vm. In S46, the image reading unit 9 moves to the next line. In S47, the ASIC 54 determines whether or not the distance moved by the image reading unit 9 has exceeded the distance (L1+Ld). The definitions of "distance moved exceeds the distance (L1+Ld)" and "immediately downstream of the image region" are the same as in the first embodiment. If the distance moved by the image reading unit 9 is shorter than or equal to the distance (L1+Ld) (S47: NO), the ASIC 54 returns to S45 and repeats processing of S45 through S47 until the reading operation of the entire image region ends.

If the distance moved by the image reading unit 9 is greater than the value (L1+Ld) (S47: YES), in other words, if the image reading unit 9 has passed a position immediately downstream of the image region, in S48 the ASIC 54 ends the image-reading and controls the image reading unit 9 to decelerate from the set moving velocity Vm. Thus, the deceleration start position of S48 approximately matches the downstream end of the image region length Ld.

As described above, the control process according to the second embodiment is simple because the ASIC 54 determines whether or not the deceleration reading operation is to be performed by checking only the image region length Ld that has been specified by the user. The reading velocity for the image reading device 2 is fixed for each of the plurality of reading modes. Thus, if the image region length Ld is shorter than the reference region length L4, the image reading operation is performed while the image reading unit 9 is moving at a fixed or constant moving velocity. If the image region length Ld is greater than or equal to the reference region length L4, the control unit 50 controls the image reading unit 9 to halt accurately at the absolute halt position 24 by performing the deceleration reading operation from a position within the image region, enabling a smaller image reading device 2.

The image reading device 2 according to the second embodiment performs the deceleration reading operation whether in a high-speed reading (low resolution) mode or a low-speed reading (high resolution) mode, regardless of the resolution specified by the user. Accordingly, the image reading device 2 can be made even smaller.

The image reading device 2 can determine the deceleration start position automatically at either a position within the image region or a position immediately downstream of the image region in the reading direction A based on the image region length Ld, by specifying only the length of the image region that is to be read. Thus, the image reading unit 9 can halt always before or at the absolute halt position 24, making the entire device smaller.

The image reading device 2 ensures that the image reading unit 9 halts accurately at the absolute halt position 24 when the image region length Ld is greater than or equal to the reference region length L4, thus enabling a smaller reading device.

On the other hand, the image reading unit 9 decelerates from a position immediately downstream of the image region when the image region length Ld is shorter than the reference region length L4, thereby enabling an absolute halt within a short distance.

With the image reading device 2 according to the second embodiment, the deceleration start position of the image reading device 2 is set to a fixed position, thereby simplifying the control processing.

In addition, the reference region length L4 can be determined simply from the maximum moving, velocity of the image reading unit 9.

Further, the image reading device 2 performs deceleration reading from the deceleration start position up to a position immediately downstream of the image region only when the deceleration start position is set to within the image region. In other words, deceleration reading is performed only when necessary. Accordingly, deterioration in image quality does not stand out.

While the invention has been described in detail with reference to the specific embodiment thereof, it would be apparent to those skilled in the art that various changes and modifications may be made therein without departing from the spirit of the invention.

What is claimed is:

1. An image reading device comprising:
an original mounting portion on which an original having an image region is placed;
an original reading unit movable in a reading direction for reading the image region, the image region having an image region length in the reading direction;
a movement control unit controlling the original reading unit to provide an acceleration region where the original reading unit accelerates from a halted state to a moving velocity, a constant-velocity region where the original reading unit maintains the moving velocity, and a deceleration region where the original reading unit decelerates from the moving velocity to the halted state, the original reading unit reading the image region at least in the constant-velocity region, the original reading unit starting to decelerate at a deceleration start position that is positioned between the constant-velocity region and the deceleration region;
a region-length acquisition unit acquiring the image region length;
a velocity setting unit setting the moving velocity of the original reading unit based on a specified image reading mode; and
a deceleration-start-position setting unit setting the deceleration start position based on the moving velocity set by the velocity setting unit;
wherein the deceleration-start-position setting unit includes a velocity comparison unit comparing the moving velocity set by the velocity setting unit with a reference velocity, thereby obtaining a comparison result; and
wherein, if the velocity comparison unit has obtained the comparison result that the moving velocity set by the velocity setting unit is greater than the reference velocity, the deceleration-start-position setting unit sets the deceleration start position to one of a position within the image region and a position immediately downstream of the image region in the reading direction, depending on the image region length and the moving velocity set by the velocity setting unit.

2. The image reading device as claimed in claim 1, wherein, if the velocity comparison unit has obtained the comparison result that the moving velocity set by the velocity setting unit is less than or equal to the reference velocity, the deceleration-start-position setting unit sets the deceleration start position to the position immediately downstream of the image region in the reading direction, regardless of the image region length.

3. The image reading device as claimed in claim 1, wherein the original reading unit includes a storage unit storing an absolute length and a required deceleration distance, the absolute length being a length from a reading start position at which the original reading unit starts reading of the original to an absolute halt position, the required deceleration distance being a distance that is required for the original reading unit to decelerate from the moving velocity and reach the halted state;
wherein the deceleration-start-position setting unit further includes:
a required-deceleration-distance acquisition unit acquiring, from the storage unit, the required deceleration distance corresponding to the moving velocity set by the velocity setting unit; and
an absolute-length comparison unit comparing the absolute length with a comparison length that is a sum of the image region length and the required deceleration distance, thereby obtaining a comparison result; and
wherein the deceleration-start-position setting unit sets the deceleration start position to one of a position within the image region and a position immediately downstream of the image region in the reading direction, depending on the comparison result of the absolute-length comparison unit.

4. The image reading device as claimed in claim 3, wherein, if the velocity comparison unit has obtained the comparison result that the moving velocity set by the velocity setting unit is greater than the reference velocity and the absolute-length comparison unit has obtained the comparison result that the absolute length is greater than or equal to the comparison length, the deceleration-start-position setting unit sets the deceleration start position to the position immediately downstream of the image region in the reading direction.

5. The image reading device as claimed in claim 3, wherein, if the velocity comparison unit has obtained the comparison result that the moving velocity set by the velocity setting unit is greater than the reference velocity and the absolute-length comparison unit has obtained the comparison result that the absolute length is less than the comparison length, the deceleration-start-position setting unit sets the deceleration start position to the position within the image region.

6. The image reading device as claimed in claim 5, wherein, if the deceleration-start-position setting unit sets the deceleration start position to the position within the image region, the deceleration start position is a position that is advanced in the reading direction from the reading start position by a length that is obtained by subtracting the required deceleration distance from the absolute length.

7. The image reading device as claimed in claim 6, wherein, if the deceleration-start-position setting unit sets the deceleration start position to the position within the image region, the original reading unit performs deceleration reading from the deceleration start position to the position immediately downstream of the image region in the reading direction.

8. The image reading device as claimed in claim 1, wherein, if the deceleration-start-position setting unit sets the deceleration start position to the position within the image region, the deceleration start position is a position that is advanced in the reading direction from the reading start position by a length that is obtained by subtracting the required deceleration distance from the absolute length.

9. The image reading device as claimed in claim 1, wherein, if the deceleration-start-position setting unit sets the deceleration start position to the position within the image region, the original reading unit performs deceleration reading from the deceleration start position to the position immediately downstream of the image region in the reading direction.

10. The image reading device as claimed in claim 1, wherein the specified image reading mode is specified from a plurality of predetermined modes.

11. The image reading device as claimed in claim 10, wherein the plurality of predetermined modes includes a plurality of monochrome modes having different resolutions in a scanner function, a plurality of color modes having different resolutions in the scanner function, a mode corresponding to a copy function, and a plurality of modes corresponding to original image types and resolutions in a facsimile function.

12. An image reading device comprising:
an original mounting portion on which an original having an image region is placed;
an original reading unit movable in a reading direction for reading the image region, the image region having an image region length in the reading direction;
a movement control unit controlling the original reading unit to provide an acceleration region where the original reading unit accelerates from a halted state to a moving velocity, a constant-velocity region where the original reading unit maintains the moving velocity, and a deceleration region where the original reading unit decelerates from the moving velocity to the halted state, the original reading unit reading the image region at least in the constant-velocity region, the original reading unit starting to decelerate at a deceleration start position that is positioned between the constant-velocity region and the deceleration region;
a region-length acquisition unit acquiring the image region length; and
a deceleration-start-position setting unit setting the deceleration start position based on the image region length acquired by the region-length acquisition unit;
wherein the deceleration-start-position setting unit includes a region-length comparison unit comparing the image region length with a reference region length, thereby obtaining a comparison result; and
wherein the deceleration-start-position setting unit sets the deceleration start position to one of a position within the image region and a position immediately downstream of the image region in the reading direction, depending on the comparison result of the region-length comparison unit.

13. The image reading device as claimed in claim 12, wherein, if the region-length comparison unit has obtained the comparison result that the image region length is greater than or equal to the reference region length, the deceleration-start-position setting unit sets the deceleration start position to the position within the image region.

14. The image reading device as claimed in claim 13, wherein, if the deceleration-start-position setting unit sets the deceleration start position to the position within the image region, the deceleration-start-position setting unit sets the deceleration start position to a position that is advanced in the reading direction from the reading start position by the reference region length.

15. The image reading device as claimed in claim 14, wherein, if the deceleration-start-position setting unit sets the deceleration start position to the position within the image region, the original reading unit performs deceleration reading from the deceleration start position to the position immediately downstream of the image region in the reading direction.

16. The image reading device as claimed in claim 12, wherein, if the deceleration-start-position setting unit sets the deceleration start position to the position within the image region, the deceleration-start-position setting unit sets the deceleration start position to a position that is advanced in the reading direction from the reading start position by the reference region length.

17. The image reading device as claimed in claim 12, wherein, if the deceleration-start-position setting unit sets the deceleration start position to the position within the image region, the original reading unit performs deceleration reading from the deceleration start position to the position immediately downstream of the image region in the reading direction.

18. The image reading device as claimed in claim 12, wherein, if the region-length comparison unit has obtained the comparison result that the image region length is less than the reference region length, the deceleration-start-position setting unit sets the deceleration start position to the position immediately downstream of the image region in the reading direction.

19. The image reading device as claimed in claim 12, wherein the reference region length is obtained based on a maximum required deceleration distance that is a distance required for the original reading unit to decelerate from a maximum moving velocity and reach the halted state.

* * * * *